United States Patent Office 3,192,056
Patented June 29, 1965

3,192,056
DIATHERMAL TREATMENT IN THE CURING AND SMOKING OF MEATS
Beverly E. Williams, La Grange Park, Ill., assignor to Hodges Research and Development Company, New York, N.Y., a corporation of California
No Drawing. Filed Dec. 13, 1962, Ser. No. 244,287
3 Claims. (Cl. 99—229)

This invention relates to diathermal treatment in the curing and/or smoking of meats and more particularly to processes for the curing and/or smoking of meats in which the temperature of the heat is rapidly raised by diathermal treatment just prior to the smoking process.

Heretofore, various meats to be smoked such as pork hams, bacon, beef briskets, beef insides, outsides, knuckles and the like are first pumped to approximately 12% over green weight with a 60° salometer pickle, 12% super nitrate and 14% nitrite much of which additional weight is dried out of the meat during the smoking process. The pumped pork hams, for example, are then put in a 40° salometer cover-pickle for an appropriate length of time, usually 48 hours, and the meat absorbs some of this pickle with thorough distribution and adequate soaking of the cuts of meat. The cuts of meat, such as pork hams, are then removed from the cover-pickle, washed and are put in a "dry" no-smoke house having an atmospheric temperature of about 140° F. where the cuts remain for about 2 hours. Smoke is usually not turned on during this 2 hour cooking period but is turned on thereafter and the smoke house temperature is elevated to approximately 170° F. the hams remaining in the super-heated smoke house for approximately 4 hours. The temperature is then raised to around 180° F. in the smoke house until the internal temperature of the hams reaches 140° F.

Of course, the temperatures and times referred to above vary with the product and the conventional practices of each plant. For example, times and temperatures will vary from hams depending on whether they are to be the ready to eat type or the heat and serve type. In either case the temperature of the meat leaving the cover-pickle is around 50° F. and the approximate 8 to 10 hour cooking and smoking period is used to elevate the temperature of the product to the cooking range of about 140° F. and to thoroughly smoke the product. Corned beef briskets are smoked at higher temperatures around 170° F. but remain at this temperature for only about 4 hours or about half the time of pork products.

Frankfurters, weiners, sausages and the like are not cured before smoking, that is, are not pumped with a pickle and are not treated in a cover-pickle but are cooked. Bacon generally is not pumped but is usually soaked in the cover-pickle.

I have now found that if the temperature of the meat products after curing or before or during smoking is raised to approximately 140° F. by diathermal treatment in from 1 to 5 minutes with subsequent smoking at around 140° F. for approximately 4 hours instead of 10 hours that a saving of more than half or approximately 6 hours in the overall processing time is obtained. Also the smoke house temperature is uniformly maintained at 140° F. instead of being elevated before the completion of the process to 180° F. The resulting product most unexpectedly has superior color, flavor and tenderness. When the diathermal treatment is accomplished by a 900 megacycle tube, the desired internal heating is rapidly obtained without external cooking of the product. I have found that the best results for present purposes are obtained by diathermal heating with radio waves of from approximately 450 to 900 megacycles but up to 2450 megacycles may be used. Higher megacycles tend to heat the meat ununiformly with the surface heating faster and to higher temperatures than the center of the meat.

It is therefore the object of the present invention to shorten the time required for processing smoked meats by raising the temperature of the meat either after curing or before or during smoking by subjecting the meat to diathermal treatment to raise the temperature of the same uniformly to approximately 140° F. in from 1 to 5 minutes prior to smoking of the meat.

The procedures of the present invention are capable of various modifications without departing from the inventive concept. Illustrative embodiments of my invention are described hereinafter for illustrative purposes and should not therefore be construed as defining or limiting the invention.

In practicing the present concept, hams and bacon after treatment in the cover-pickle were subjected to diathermal treatment with radio or microwaves of from 450 to 900 megacycles and from 1 to 5 minutes so that the meat reached the uniform internal and external temperature of approximately 140° F. This temperature was reached in from 1 to 5 minutes and thereafter the meat was placed in the smoke house and smoked for normal smoke periods of from 2 to 6 hours. Up to 6 hours were saved over conventional curing and smoking procedures and the resulting hams and bacon slabs had better external appearance with less drying of the meat. The inside cuts and individual slices were of deeper, richer brown-red color, had better smoked flavor and were more tender than mate product from the same hogs processed by the conventional method.

In another example of the present concept whole hams and slabs of bacon after soaking in the cover-pickle and having a temperature of approximately 50° F. were subjected to diathermal treatment of radio wave tubes producing from 450 to 900 megacycles and a uniform temperature throughout the meat of 140° F. was obtained in approximately 2 minutes. The uniformly heated meat was then put in the conventional smoke house having an ambient temperature of 160° F. The external temperature of the meat during the smoke period of 4 hours rose to approximately 150° F. and the internal temperature of the meat reached approximately 145° F. during the 4 hour smoke period.

In another example of the present concept frankfurters, weiners and sausages were prepared and then diathermally heated to approximately 140° F. in from 1 to 5 minutes before smoking with substantial savings in time of the procedure and improved products in color, flavor and tenderness.

The savings thus obtained by this process are significant in reduction of the elapsed time from 8 to 10 to approximately 4 hours and in reduction of smoke house temperature from 170/180° to 140/150° F., it being understood that it is the usual practice to finish-off hams at 180° F. in the smoke house.

If desired, the overall time could be reduced to three hours by keeping the smoke house at 160° F. but this shorter time in the smoke house reduces the period for absorption of the smoke for flavor. It was found that because the hams and slabs of bacon were up to temperature of 140° F. before entering the smoke house that absorption of smoke was better and more rapid with better penetration as evidenced by the uniform appearance and smoked taste of meat slices after cutting.

The quick elevation of temperature of the meat by microwave instead of external heat has been found to produce not only greater but more uniform tenderness of the meat. Diathermal heating of the meat heats the product uniformly internally as well as on the surface. It should be noted that the megacycle range should be on the low side of from approximately 450 to approximately 900 megacycles but up to 2450 megacycles may be used.

It should now be apparent that the present invention satisfies the objectives discussed above.

Changes in the illustrative procedures described above may now be suggested to those skilled in the art without departing from the present inventive concept. Reference should therefore be had to the appended claims to determine the scope of this invention.

What is claimed is:

1. In a process for curing and smoking meats, the steps of curing the meat and then raising the internal temperature of the meat uniformly and rapidly without external cooking of the meat before smoking to approximately 140° F. in from 1 to 5 minutes by radio microwaves of from approximately 450 to approximately 900 megacycles and thereafter completing the smoking process in approximately 4 hours at a temperature of approximately 140° F.

2. In a process for curing and smoking meats, the steps of curing the meats with a saline pickle solution, then raising the internal temperature of the meat uniformly and rapidly without external cooking of the meat to approximately 140° F. in from 1 to 5 minutes by radio microwaves of from approximately 450 to approximately 900 megacycles and thereafter completing the smoking of the meats in from approximately 2 to approximately 6 hours at a temperature of from approximately 140° F. to approximately 150° F.

3. In a process for smoking meats, the steps of curing the meat and diathermally raising the internal temperature of the meat uniformly and rapidly without exterior cooking of the meat during smoking to approximately 140° F. in from 1 to 5 minutes by radio microwaves from approximately 450 to approximately 900 megacycles and thereafter completing the smoking process in from approximately 2 to approximately 6 hours at a temperature of from approximately 140° F. to approximately 150° F.

References Cited by the Examiner
UNITED STATES PATENTS

| | | | |
|---|---|---|---|
| 2,612,596 | 9/52 | Gross. | |
| 2,844,478 | 7/58 | Hanley et al. | 99—229 |
| 2,937,097 | 5/60 | Draudt et al. | 99—229 X |
| 2,973,277 | 2/61 | Barnett et al. | 99—229 |
| 2,980,544 | 4/61 | Mills | 99—229 |

A. LOUIS MONACELL, *Primary Examiner.*

HYMAN LORD, *Examiner.*